Figure 1:
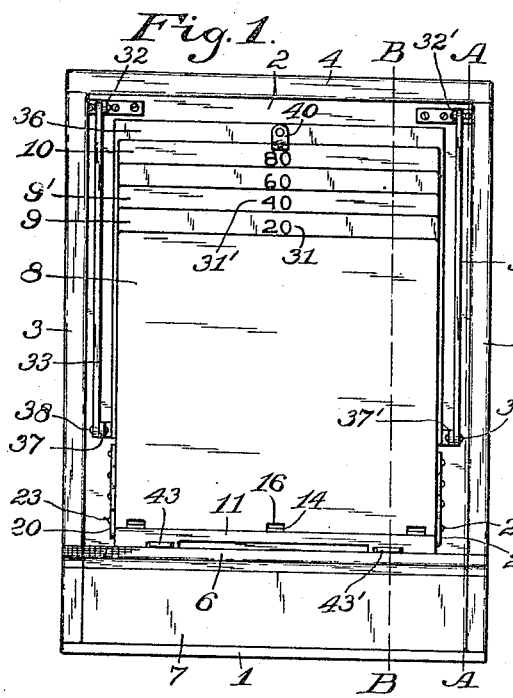

E. B. MOSELEY.
FILING APPLIANCE.
APPLICATION FILED APR. 8, 1908.

1,141,403.

Patented June 1, 1915.
4 SHEETS—SHEET 1.

WITNESSES:
J. H. Gardner
K. R. Woddell

INVENTOR:
Emerson B. Moseley,
BY
E. T. Silvius,
ATTORNEY.

E. B. MOSELEY.
FILING APPLIANCE.
APPLICATION FILED APR. 8, 1908.
1,141,403.
Patented June 1, 1915.
4 SHEETS—SHEET 2.
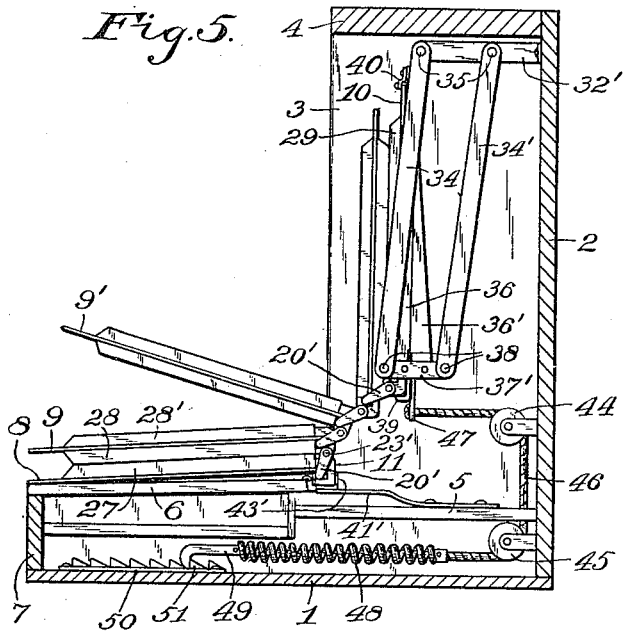
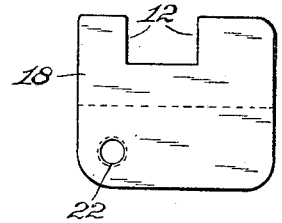
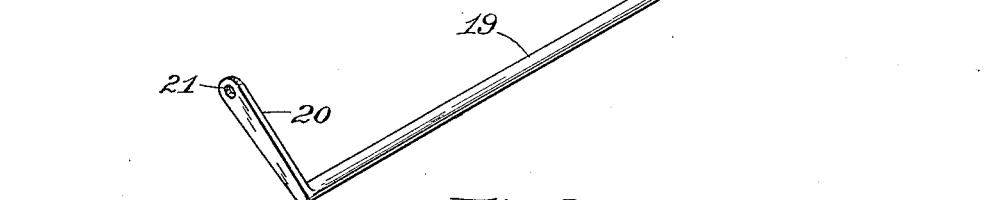
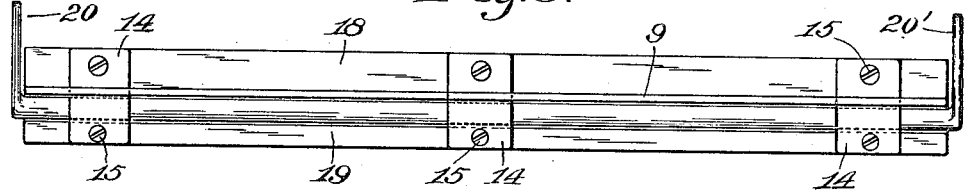
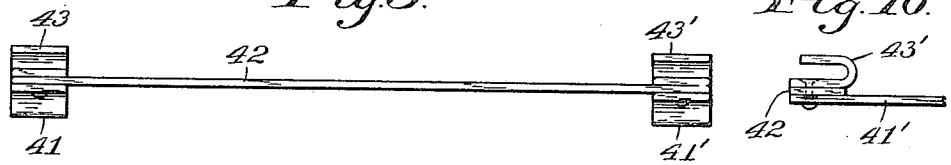
WITNESSES:
J. H. Gardner
K. R. Woddell
INVENTOR:
Emerson B. Moseley,
BY E. T. Silvius,
ATTORNEY.

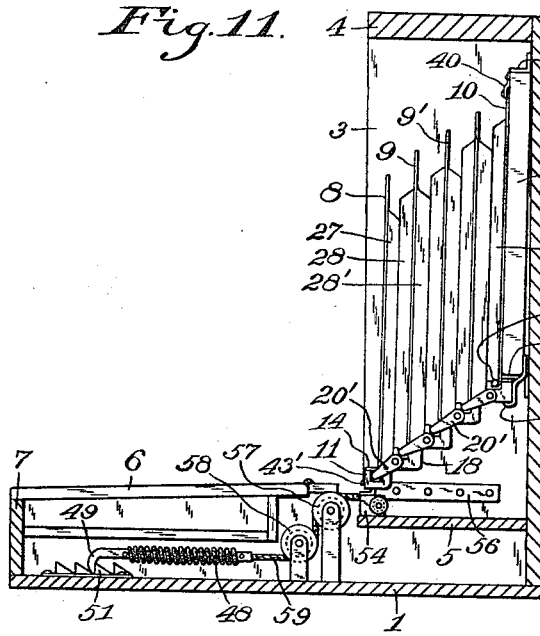
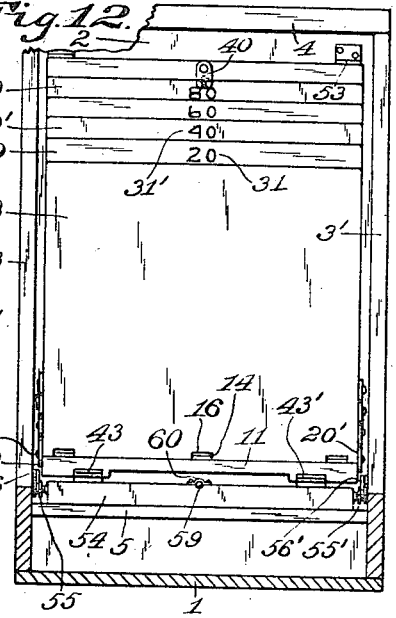
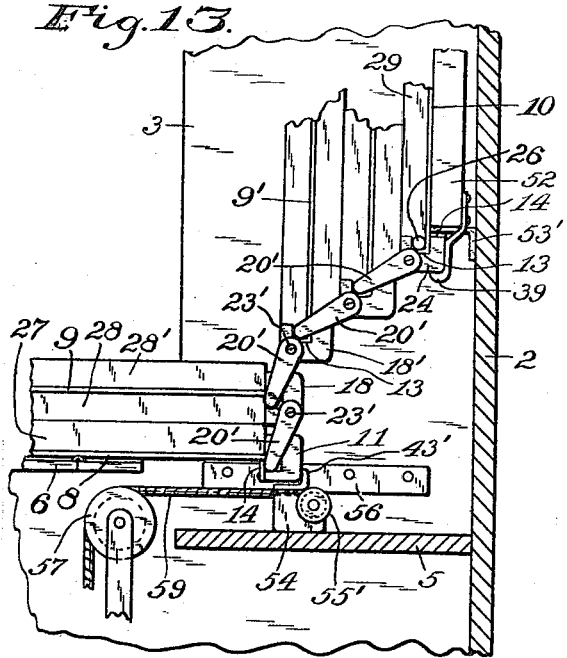
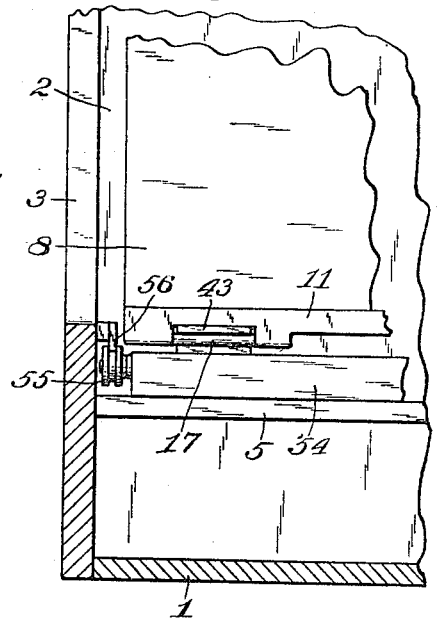

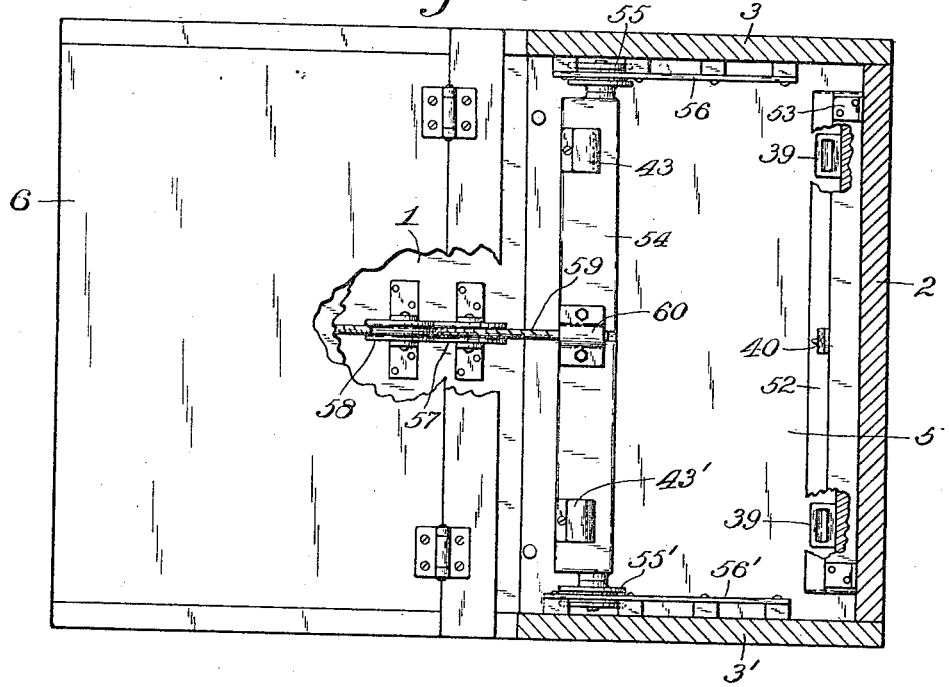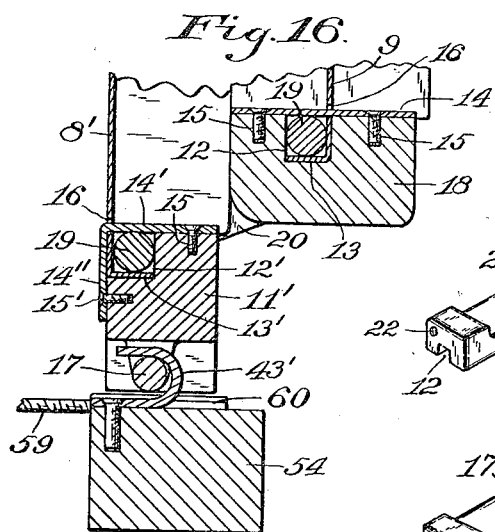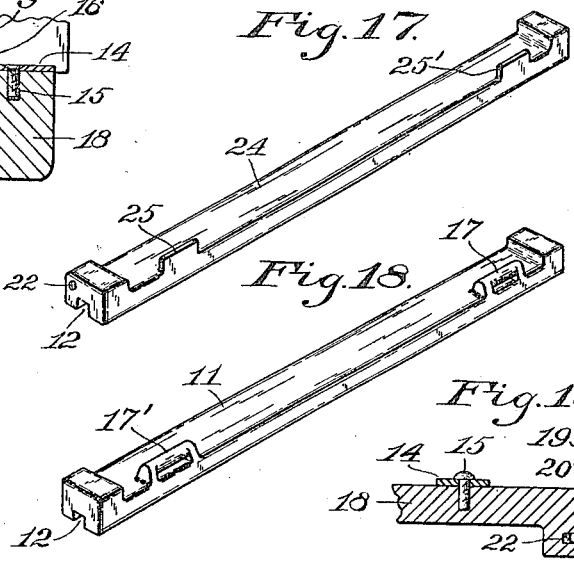

UNITED STATES PATENT OFFICE.

EMERSON B. MOSELEY, OF ALLIANCE, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,141,403.   Specification of Letters Patent.   Patented June 1, 1915.

Application filed April 8, 1908. Serial No. 425,915.

*To all whom it may concern:*

Be it known that I, EMERSON B. MOSELEY, a citizen of the United States, residing at Alliance, in the county of Stark and State of Ohio, have invented certain new and useful Improvements in Filing Appliances; and I do declare the following to be a full, clear, and exact description of the invention, reference being had to the accompanying drawings, and to the letters and figures of reference marked thereon, which form a part of this specification.

This invention relates to filing appliances that are made use of in credit accounting systems, the invention having reference more particularly to bill-holding leaves which comprise parts of the appliances, the invention having reference also to the means for supporting the leaves, and to means for balancing the leaves.

Objects of the invention are to provide improvements in credit accounting or filing appliance whereby the construction thereof may be simplified and cheapened; to provide improved devices for connecting the leaves that will permit of the leaves being stepped when upright and also permit the leaves to lie fairly one upon another to form a rectangular pack when drawn forward, so that the forward edges of all the leaves will be in substantially one vertical plane; and to provide improvements whereby the leaves may be spring-balanced in a simple, effective, and durable manner, further objects being made apparent by reference to the following description.

With the above mentioned and other objects in view the invention consists in an improved filing appliance comprising a plurality of bill-holding leaves provided with automatically movable hinging devices whereby the leaves are hinged one to another in a group, and permitting the leaves to be stepped when upright and in non-stepped positions when approximately horizontal; novel means for supporting the plurality of leaves, and novel devices for applying spring mechanism to the leaves for holding them normally in upright positions and for assisting to raise the leaves from horizontal to upright positions.

The invention consists also in the novel elements and combinations and arrangements thereof as hereinafter particularly described and defined in the appended claims.

Figure 2:
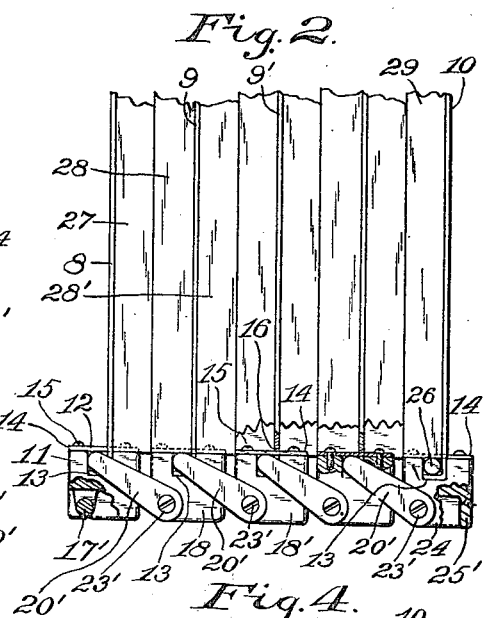
Figure 3:
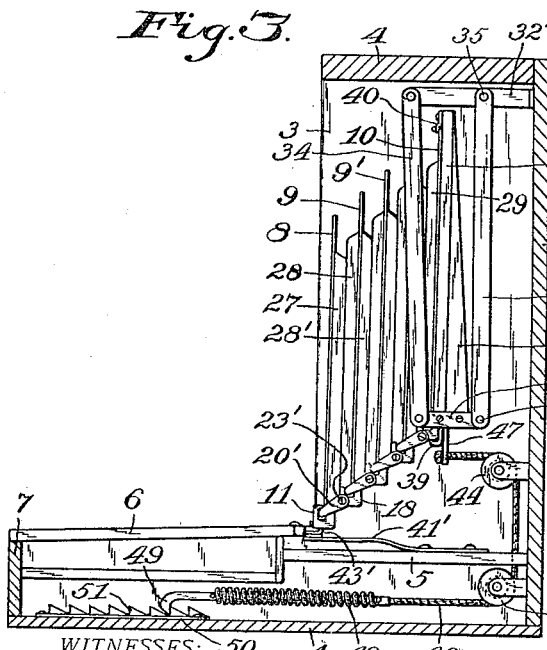
Figure 4:
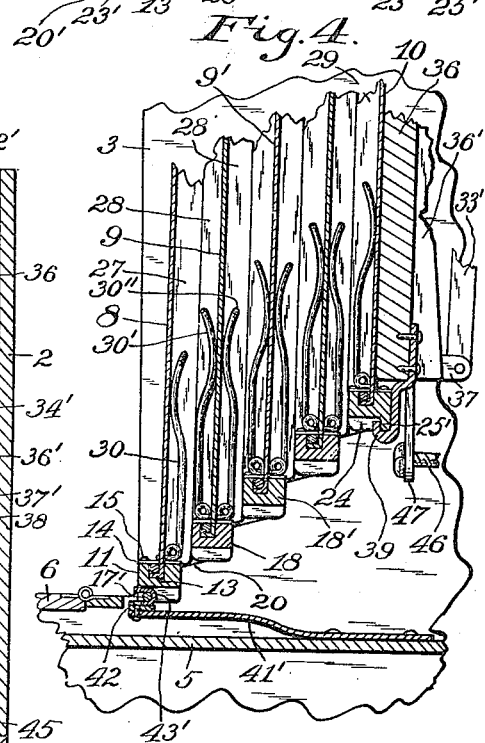

Referring to the drawings, Figure 1 is a front elevation of the improved filing appliance constructed substantially in accordance with the invention; Fig. 2, a fragmentary side elevation showing the leaves removed from the casing of the appliance or cabinet, and arranged in a rectangular pack so as to be compact for insertion into a fireproof safe or vault when not in use; Fig. 3, a vertical sectional view approximately on the line A A in Fig. 1; Fig. 4, a fragmentary sectional view approximately on the line B B in Fig. 1; Fig. 5, a sectional view showing a number of the leaves drawn forward as they would appear at the plane of the line A A in Fig. 1; Fig. 6, an end view of the hinge-bar of a bill-holding leaf; Fig. 7, a perspective view of a hinge-rod and links whereby either two of the leaves are connected together; Fig. 8, a top view of one of the leaves, minus the frame-strips and bill-clamps thereof and showing the top plan of the hinge-bar and the hinge-rod connected therewith; Fig. 9, a front elevation of one of the forms of pivotal supports for the foremost leaf; Fig. 10, a fragmentary side elevation of the pivotal support; Fig. 11, a sectional view corresponding to the line A A in Fig. 1 showing modifications in the supports of the leaves and in the arrangement of the balancing devices; Fig. 12, a front elevation of the appliance having the modifications incorporated therein, a portion of the register case being in a vertical section on a plane at the front of the leaves; Fig. 13, a fragmentary sectional view on the plane corresponding to the line A A in Fig. 1 showing a number of the leaves in horizontal positions in connection with the modified form of supports therefor; Fig. 14, a fragmentary sectional elevation similar to a portion of Fig. 12 on an enlarged scale; Fig. 15 a horizontal sectional view of the cabinet case taken immediately below the top thereof without the bill-holding leaves; Fig. 16, a fragmentary sectional view showing modifications in the leaves and supports; Fig. 17, a perspective view of the hinge-bar of the rearmost leaf inverted; Fig. 18, a perspective view of the hinge-bar of the foremost leaf inverted, and Fig. 19, a fragmentary sectional detail view of the hinge-bar and hinging devices of one of the intermediate bill-holding leaves.

Similar reference characters in the several figures of the drawings designate like elements or features of construction.

A filing appliance usually comprises a suitable case, the forward portion of which is suitable for use as a writing-desk, and the rearward portion is adapted to incase the bill-holding leaves in their normal upright positions, the desk portion being convenient on which to draw the leaves down for inserting or removing bill-slips, which are to be held in systematic order on the leaves in the usual manner. The case may suitably comprise a bottom 1, a back 2, two sides 3 and 3', and a top 4, and for the purposes of the present invention a floor 5 is placed in the case somewhat above the bottom 1, and extending forward from the back 2, and a suitable desk-top 6 covers the forward or desk portion of the case which has a suitable front 7. Any other features found desirable may be obviously added to the case.

A suitable number of bill-holding leaves comprise a front leaf 8, intermediate leaves 9, 9', and a rear leaf 10. The front leaf has a hinge-bar 11 in the top of which is a longitudinal groove 12, and the metallic plate of which the leaf proper is composed extends into the groove and has a flange 13 resting on the bottom of the groove. A suitable number of plates 14 are secured by screws 15 on the top of the hinge-bar, and the plates extend across the groove and through slots 16 that are cut in the leaf, thus securing the leaf proper to its hinge-bar. The leaf however may be attached to the hinge-bar in any other desired manner if preferred. The under forward side of the hinge-bar 11 has a plurality of hinge-pins as 17 and 17' formed thereon for pivotally supporting the leaf and thereby assisting to support the intermediate leaves. The intermediate leaves have each a hinge-bar as 18 or 18' attached thereto substantially as above described, each hinge-bar having the groove 12 in the top thereof. Each two adjacent leaves are connected together by means of a hinge-rod 19 that is arranged rotatively in the groove 12 on the top of the flange 13 and under the plates 14 of the hinge-bar of the forward one of the two leaves, each hinge-rod having two integrally formed links 20 and 20' on the ends thereof, and extending at right-angles to the axis of the hinge-rod, the hinge rod serving to connect the links pivotally to a leaf, each link having a pivot-hole 21 in the end thereof, the links extending to the ends of the next adjacent rearward hinge-bar, each one of the intermediate hinge-bars having a threaded hole 22 in each end thereof, and pivots 23 and 23' are inserted through the holes 21 and screwed into the holes 22, thus connecting the hinge-bars of two leaves together. The links may be of such length, relatively to the widths of the hinge-bars, that the hinge-bars will be close together when resting on the same plane, or the hinge-bars may be somewhat narrower as shown for clearness, and the remaining portions of the leaves will be so designed as to be close together in a compact group. The hinge-bar 24 of the rear-leaf has a pair of lugs 25 and 25' at the under side of the rear portion thereof, and this hinge-bar, like the others, has the groove 12 in the top thereof and also the holes 22 to receive the pivots whereby it is connected to a pair of the links 20 and 20', and a rod 26 is held securely on the flange 13 by means of the plates 14 for securing the hinge-bar to the leaf 10.

As is usual, the front leaf 8 has frame-strips 27 on the rear side thereof; the intermediate leaves each have frame-strips 28 or 28' on both sides thereof, and the rear leaf 10 has frame-strips 29 only on the forward side thereof; and the front leaf has bill-clips 30 on the rear side thereof and similar bill-clips 30' or 30'' are arranged on both sides of the intermediate leaves, and on the forward side only of the rear leaf, for holding the bill-slips securely on the leaves in the usual manner. The links 20 and 20' are of suitable length so that the leaves will be slightly separated when the links are in horizontal positions but will draw the leaves close together when the bottoms of the hinge-bars are in one and the same plane, and the links are inclined as in Fig. 2, or when the leaves are stepped up in their normal positions, and the links are in opposite inclined planes, as in Fig. 3, or Figs. 4 and 11, so that it will be apparent that if the group as shown in Fig. 2 be turned forward so that the leaves will be in horizontal position they will all lie fairly one upon another with their hinged ends in the same vertical plane. The upper ends of the leaves have index characters as 31 or 31' on the forward sides thereof, the indexing being plainly visible to an observer at the front of the leaves.

A pair of supports as 32 and 32' are suitably attached fixedly to the case in the upper portion thereof, two links 33 and 33' are connected to the support 32 at a suitable distance apart, and two other links 34 and 34' are connected to the other support 32', the links being connected by means of pivots 35. A back-board 36 having reinforcements 36' is provided with a pair of pivot-bars 37 and 37' at the bottom thereof and the pivot-bars are connected by pivots 38 to the links last referred to whereby the back-board is supported so as to swing forward or backward while remaining upright at all times, its position when moved forward being nearly parallel to its position when moved rearward, said back-board and its connecting bars and links forming a follower to move the rearmost leaves forward by simple means, when the forward leaves are drawn on the desk top 6, so as to be within convenient reach of the user. The bottom of the back-board 36 is provided with sockets 39 into which the lugs 25 and 25' of the hinge-bar of the rear leaf are inserted for support, and the upper end of the back-board 36 is provided with a button or latch 40 to engage the upper end of the rear leaf 10, and thereby secure it to the back-board Supporting devices for the front leaf comprise preferably a pair of plate springs 41 and 41' that are secured on the floor 5 under the group of leaves and extend forward approximately to the plane of the front leaf and preferably having a tie-bar 42 attached thereto, the springs being provided with a pair of hooks 43 and 43' respectively that are engaged by the hinge-pins 17 and 17' of the pivot-bar 11, the loops of the hooks being rearward of their points and serving as pivotal supports when the forward leaves are drawn down on the top 6.

A pulley 44 is suitably supported by the back 2 slightly lower than the back-board 36, and another pulley 45 is suitably supported near the bottom 1 of the case, a cord 46 or similar device extending under the pulley 45 and upward over the pulley 44 between the two pulleys and the back 2, the upper end of the cord being attached to a lug 47 with which the bottom of the back-board 36 is provided. The lower end of the cord is connected to a relatively long coil spring 48 to which is connected a hook 49 that is adapted to be adjustably connected to a rack-plate 50 which is secured to the bottom 1 and provided with teeth 51, so that the hook may be connected to either one of the teeth for adjusting the tension of the spring. It will be seen therefore that the action of the spring pulling on the cord 46 constantly draws the back-board 36 rearward, and the links 20 and 20' act to draw all the leaves rearward, one against another because of the fact that the hinge-rod 19 of either leaf is located above the pivots 23 and 23' of the leaf whereby it is connected to the next adjoining forward leaf, the hooks 43 and 43' acting to resist the pull of the spring and hold down the forward leaves. The tension of the spring also assists in lifting the leaves after they have been drawn forward, as will be obvious.

In Figs. 11 to 16 inclusive are shown modifications in the supporting and balancing devices of the leaves which provide that instead of drawing the rearward leaves forward when the forward leaves are down, the forward leaves are drawn rearward while they are being drawn down upon the top 6, so that the user may find the rearward upright leaves within convenient reach by advancing toward them while the forward leaves are being drawn down for use. For supporting the rear-leaf a back-board 52 is secured against the back 2 of the case as by knees 53 and 53' or otherwise as may be desired, and it is provided with the sockets 39 and the button 40 whereby the rear-leaf 10 is connected in a stationary manner to the back-board. It will be understood of course that the back 2 of the case may be suitably equipped to adapt it to serve as a back-board 52. For pivotally supporting the front leaf 8 a movable pivot-block 54 is provided that is supported by the floor 5 and may slide thereon and obviously may be provided with roller bearings if desired, although while in use the block does not necessarily move in contact with the floor, and the block is provided with grooved rollers 55 and 55' that engage the under sides of a pair of track-rails 56 and 56' which are mounted on the sides 3 and 3' of the case and which coöperate with the pivotal connections to move and guide the block 54 during movements of the leaves, the result being that the block may move forward or backward in one plane and cause the leaves to operate in the desired manner. The block 54 is provided with the pivoting-hooks 43 and 43' which are engaged by the pivot-pins 17 and 17' of the front leaf. A grooved pulley 57 is suitably supported at the front of the floor 5, and another pulley 58 is suitably supported near the bottom 1, and forward of the pulley 57. A cord 59 or similar device is connected to the spring 48 and extends under the pulley 58 and up over the pulley 57 and is attached to the block 54 in any suitable manner, as by a clamp 60, so that the action of the spring 48 operates to constantly draw the pivoting-block 54 forward and therefore tends to draw the bottoms of the leaves forward, the result being that the leaves are spring-balanced by applying the tension to the forward leaf instead of applying it to the rear leaf. With this modified construction and arrangement of the balancing-cord when one or more of the forward leaves are drawn down on the top 6 as in Fig. 13 the leaves will lie fairly one upon another without being stepped, and as each leaf is drawn down it is drawn rearward and forces the leaves that may be under it rearward also by means of the links 20 and 20', as will be clearly understood by reference to the drawings.

When it is desired to avoid projections at the front of the front leaf and at the rear of the rear leaf, the hinge-bars of these leaves may be made relatively narrower than the hinge-bars of the intermediate leaves as illustrated in Fig. 16 in which the hinge-bar 11' has a groove 12' in the upper forward portion thereof, and the leaf 8' has a flange 13' turned rearward in the groove so that the leaf proper is flush with the forward side of the hinge-bar. A plate 14' is secured by a screw 15 to the top of the hinge-bar and extends over the hinge-rod 19 and through the slot or aperture 16, the plate having an angle-flange 14'' extending against the front of the hinge-bar and secured thereto by a screw 15'. The hinge-bar 11' is provided with the hinge-pin 17 as hereinbefore described.

In practical use it is customary to place duplicate bills of sale on the bill-holding leaves in systematic order so that the account of any credit customer may be instantly found by the merchant using the credit accounting system and appliances. In order to insert new bill-slips or ascertain the amount due from the customer, the leaf containing this account together with all leaves that may be forward of such leaf are drawn forward onto the top 6 except when the account desired is on the forward side of any leaf, in which case such leaf need not be drawn forward. In the conduct of a large business a great many leaves may be required in a group to accommodate a large number of accounts, and therefore the convenience of having the rear leaves within easy reach when the forward leaves are drawn down will be apparent, this being accomplished in a simple manner by the present invention, including the modified form of construction. It may be remarked that in the modified construction the front leaf 8 when drawn down on top 6 may extend forward beyond the front 7 a suitable distance, and then when other leaves are drawn forward so that otherwise it would be inconvenient to reach the rear leaves, the difficulty is obviated by reason of the forward leaves being drawn rearward so that the user may advance with them in order to conveniently reach the rear-leaf. At the close of business hours the forward leaf may be disconnected from the pivoting hooks 43 and 43' and the rear leaf disconnected from sockets 39, after which the leaves may be bunched conveniently as illustrated in Fig. 2 for insertion in a suitable place for safe keeping.

I disclaim as my invention " a series of filing leaves located face to face, and a series of links connecting the normal lower ends of the leaves, one end of each link being pivoted to one leaf adjacent to its lower end, and the other end being pivoted to the adjoining leaf above the pivot-point of another link, whereby the leaves are adapted to be collocated either in echelon or in a rectangular pack and to have their free ends opened apart," believing George Jacobs to be the original, and first inventor of the same, as disclosed in his application, Serial No. 434,866, filed May 25, 1908.

Having thus described the invention what is claimed as new, is—

1. Filing appliances including a case, a pair of pivoting hooks mounted in the case with the loops of the hooks rearward of the points thereof, a plurality of bill-holding leaves arranged as a group, connections between the leaves permitting them to swing relatively to each other, one end leaf of the series of leaves having pivots removably connected to the pivoting hooks, means for supporting the opposite end leaf of the series of leaves, and a spring connected with the case and having operative connection with one of the end leaves and acting to cause pressure between the pivots and the loops of the hooks to normally hold the leaves in substantially upright positions.

2. Filing appliances including a case, a pair of pivoting hooks mounted in the case with the loops of the hooks rearward of the points thereof, a plurality of bill-holding leaves arranged as a group, the foremost and rearmost leaves being outer leaves of the group, means loosely connecting the leaves one to another, all the leaves being normally upright in the case, the foremost one of the leaves having a pair of pivots connected to the pivoting hooks, all the leaves being movable to horizontal positions, means supporting the rearmost one of the leaves, a spring connected with the case, and means serving to connect the spring operatively with one of the outer leaves, the spring acting to cause pressure between the pair of pivots and the loops of the pair of hooks to normally hold the leaves in substantially upright positions.

3. In a filing appliance, the combination of a plurality of leaves, means for normally supporting the leaves as a whole uprightly in echelon comprising a relatively stationary support for one end leaf, a movable support for the other end leaf, and means connecting the normally lower ends of the leaves loosely together; whereby the leaves are suspended between the supports and are permitted to form a rectangular pack as they are swung from upright to reclined position.

4. Filing appliances including a series of leaves arranged as a normally upright group, a series of hinge-rods having each a pair of links rigid thereon and connecting the normally lower ends of the leaves together, the hinge rods being rotatively connected each to a leaf, and the links connected pivotally to an adjacent leaf.

5. Filing appliances including a case, a series of leaves grouped uprightly in the case and the rearmost one of the leaves supported in the case, and means connecting the normally lower ends of the leaves loosely together whereby the leaves intermediate of the foremost and rearmost leaves are suspended in echelon relative to the rearmost one of the leaves, the foremost one of the leaves being pivotally connected with the case.

6. Filing appliances including a case, a series of leaves grouped uprightly in the case and the rearmost one of the leaves supported in the case, means connecting the normally lower ends of the leaves loosely together whereby the leaves intermediate of the foremost and rearmost leaves are suspended in echelon relative to the rearmost one of the leaves and the forward ones to the next adjacent rearward ones, the foremost one of the leaves being pivotally connected with the case, and a spring connected with the case and acting through the pivotal connections of the leaf with the case to normally hold the leaves upright.

7. Filing appliances including a case with a back-board provided with supporting devices for connecting a leaf thereto, a substantially stationary supporting device mounted in the case forward of the plane of the back-board and in a lower plane than the supporting devices thereof, and a plurality of upright bill-holding leaves having links connecting the leaves one to another at their lower ends, the rearmost one of the leaves having bearing devices connected removably to the supporting devices of the back-board and the foremost one of the leaves pivotally connected removably to the stationary supporting device.

8. Filing appliances including a case, guides mounted in the case for guiding horizontally, an upright back-board mounted on the guides to move horizontally, a substantially stationary supporting device mounted in the case forward of the plane of the back-board, a plurality of bill-holding leaves arranged in a group, the leaves being normally upright and the rearmost one of the leaves removably connected to the back-board and the foremost one of the leaves having pivots removably connected to the supporting device for moving the leaves to horizontal positions, hinging means connecting the leaves one to another, and a spring mounted in the case and acting through the back-board and the supporting device to normally hold the leaves upright.

9. In filing appliances, the combination of a case, two pairs of links pivotally supported in the case, a back-board supported by the links to swing in the case, a supporting device mounted in the case, and a plurality of bill-holding leaves connected together and the rearmost one of the leaves connected to the back-board, the foremost one of the leaves being pivotally connected to the supporting device.

10. In filing appliances, the combination of a case, a pair of pivoting supports mounted in the case, supporting guides mounted in the case to guide horizontally, a back-board supported by the guides to move horizontally, a plurality of bill-holding leaves arranged as a group and the rearmost one thereof connected to the back-board, the foremost one of the leaves being connected pivotally to the pivoting supports, means loosely connecting the leaves one to another at their normal lower ends, the leaves normally being upright and movable forward to horizontal positions, the forward movements of the leaves drawing the back-board forward, and means connected with the back-board for drawing the back-board rearward and the leaves to upright positions.

11. In a filing appliance, the combination of a casing, a series of leaves having connections between them, said connections permitting said leaves to swing relatively to each other, means for guiding the rearmost leaf of the series, and a spring support on the casing for the frontmost leaf and permitting it to be operated pivotally.

12. In a filing appliance, the combination of a casing, a series of leaves having connections between them, said connections permitting said leaves to swing relatively to each other, means for guiding the rearmost leaf of the series, the said guiding means comprising a pair of links pivoted at their opposite ends to said casing and said rearmost leaf, and means for supporting the frontmost leaf of the series.

13. A frame for a filing appliance comprising a base bar formed with a longitudinally extending groove, a back provided with a flange resting in the groove, a rod arranged in the groove and engaging with the said flange, and a plate secured to the base bar and overlying the said rod to secure it and the said back in the groove.

14. In a filing appliance, the combination of a casing, a series of leaves having connections between them permitting said leaves to swing relatively to each other, the front end leaf of the series of leaves being provided with pivots, means, carried by the casing, for yieldably supporting the pivots of the front end leaf, and means for guiding the rear end leaf.

15. In a filing appliance, a case, a series of leaves, means permitting the said leaves to swing from vertical to horizontal position in the case and vice versa, and a follower pivoted above the leaves to the case and extending back of the leaves.

16. In a filing appliance, a case, a series of leaves, means permitting the leaves to swing from vertical to horizontal position in the case and vice versa, a follower pivoted a distance beyond the free ends of the leaves and engaging with a leaf of the leaf pack.

17. In a filing appliance, a case, a series of leaves, means permitting the leaves to swing from vertical to horizontal positions and vice versa, a follower pivoted above the lower ends of the leaves and engaging with a leaf of the leaf pack.

In testimony whereof, I affix my signature in presence of two witnesses, on the first day of April, 1908.

EMERSON B. MOSELEY.

Witnesses:
J. J. BROWN,
L. W. LEWIS.

Copies of this patent may be obtained for five cents each, by addressing the "Commissioner of Patents, Washington, D. C."